Dec. 23, 1941.  S. RUBEN  2,266,809
ELECTROSTATIC CONDENSER AND DIELECTRIC THEREFOR
Filed June 19, 1939    6 Sheets-Sheet 1

INVENTOR
Samuel Ruben
BY
ATTORNEY

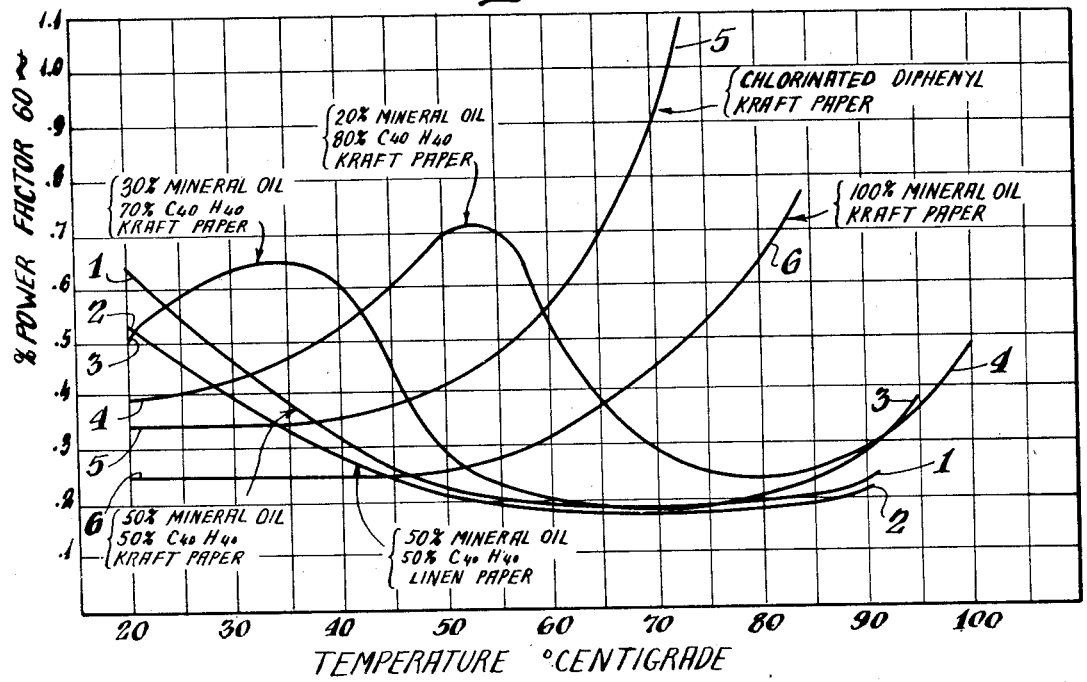
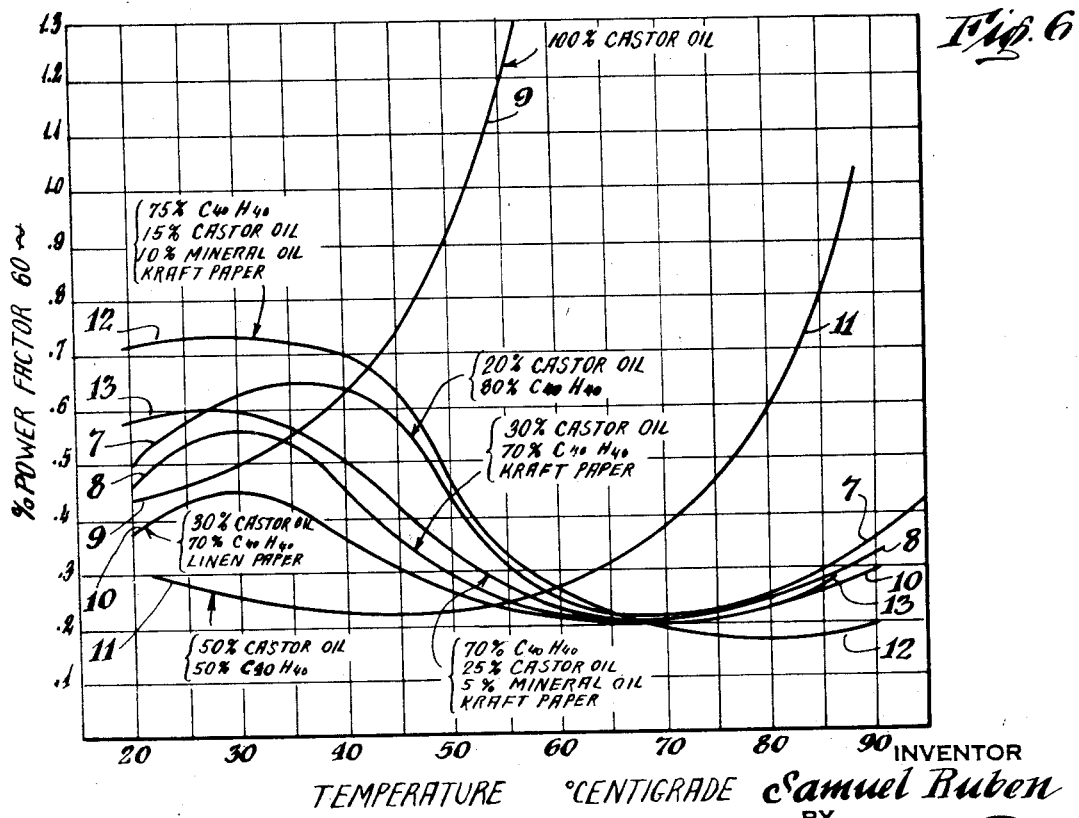

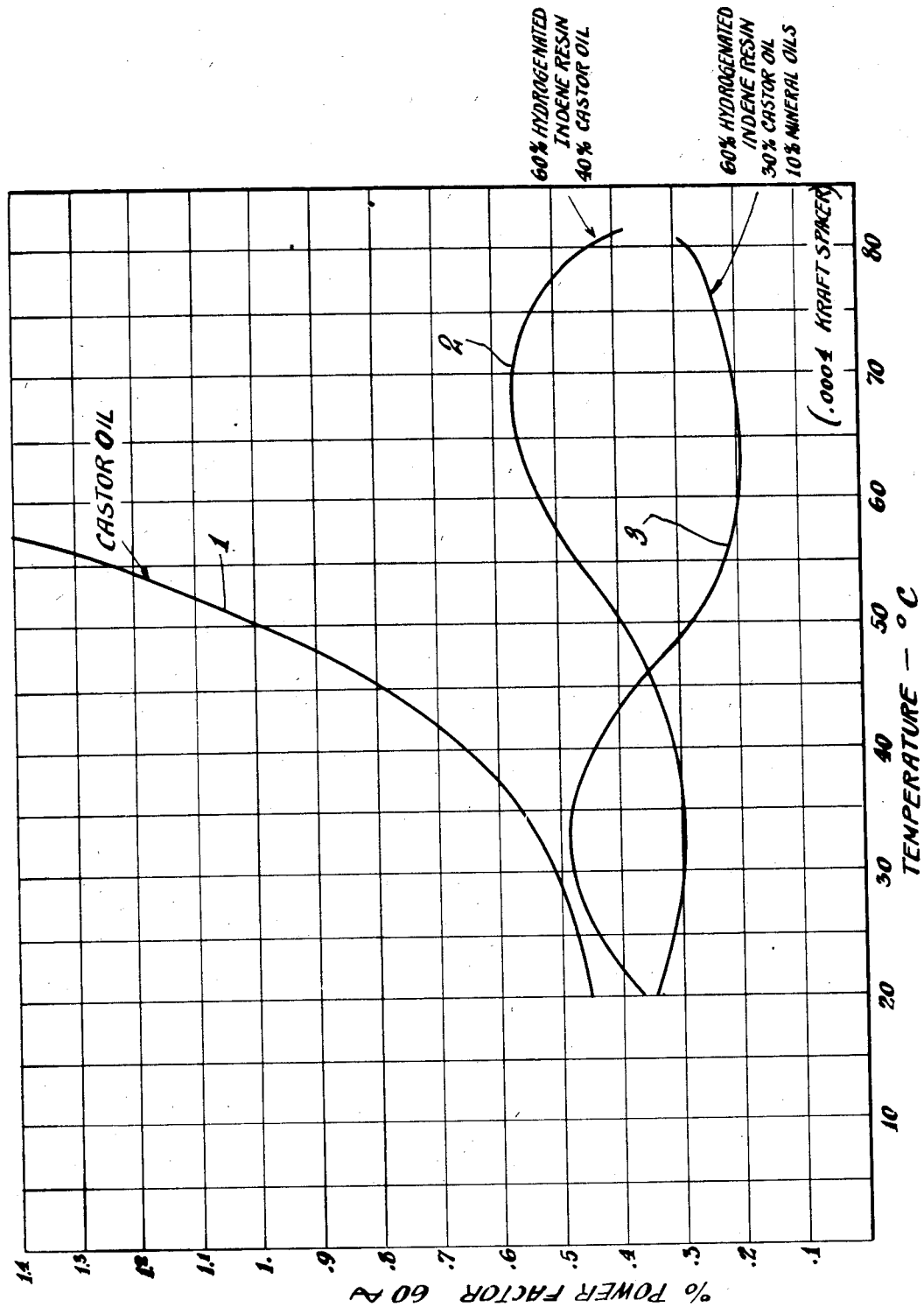

Dec. 23, 1941.  S. RUBEN  2,266,809
ELECTROSTATIC CONDENSER AND DIELECTRIC THEREFOR
Filed June 19, 1939  6 Sheets-Sheet 5

INVENTOR
Samuel Ruben
BY
ATTORNEY

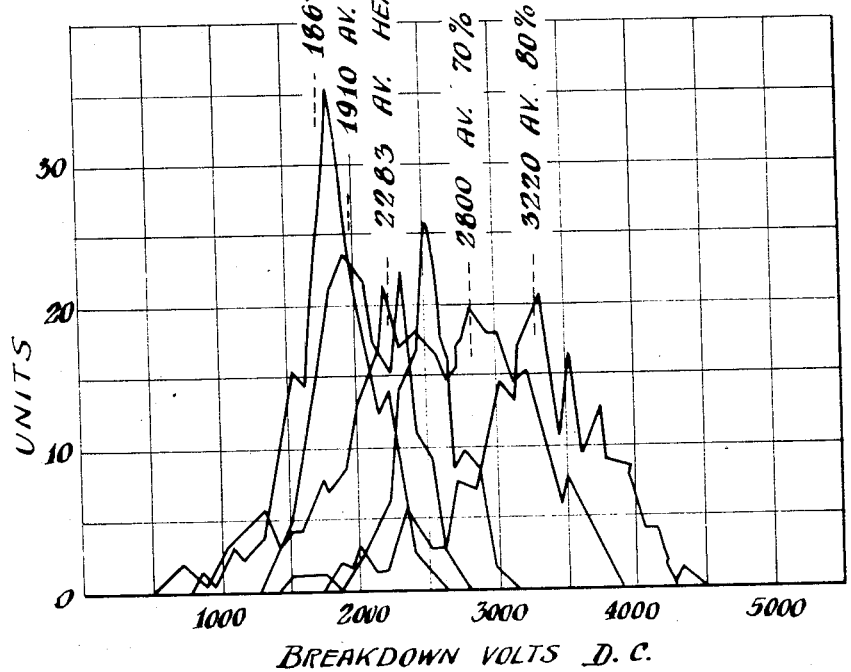

Patented Dec. 23, 1941

2,266,809

UNITED STATES PATENT OFFICE 2,266,809

ELECTROSTATIC CONDENSER AND DIELECTRIC THEREFOR

Samuel Ruben, New Rochelle, N. Y.

Application June 19, 1939, Serial No. 279,824

14 Claims. (Cl. 175—41)

This invention relates to electrostatic condensers.

The application is a continuation in part of my copending applications Serial No. 220,061, filed July 19, 1938, entitled "Dielectric for electrostatic condensers and condensers made therefrom," application Serial No. 235,543, filed October 18, 1938, entitled "Electrostatic condenser," application Serial No. 243,346, filed December 1, 1938, entitled "Condenser dielectric," and application Serial No. 255,819, filed February 11, 1939, entitled "Dielectric for electrostatic condensers," which applications were all continuations in part of my prior application Serial No. 86,534, filed July 2, 1936, entitled "Electrostatic condenser."

The general object of the invention is the provision of a new solid type of electrostatic condenser having high voltage breakdown and insulation resistance, which has a decreasing power factor characteristic with increase in temperature over the normal temperature operating range of the condenser and in which the dielectric and condenser armatures are always in intimate complete contact during periods of use or nonuse and where such conditions continue permanently over long periods of operation on alternating or direct current, unaccompanied by progressive oxidation or hardening or any resultant tendency of dielectric and electrode to separate.

A specific object is the provision of an electrostatic condenser of the closely spaced wound foil type employing a solid organic dielectric, capable of operation on alternating current.

A further object is the provision of an electrostatic condenser employing a solid organic dielectric which is superior to electrostatic condensers employing a liquid dielectric.

Another object is the provision of an electrostatic condenser employing a dielectric which is solid and non-flowing at normal temperature but which has a low viscosity at high temperatures and which may readily be impregnated into porous spacers or conveniently cast into desired shape.

Still another object is the provision of an electrostatic condenser employing a solid dielectric which also acts as a moisture proof seal.

Another object is the provision of an electrostatic condenser employing a dielectric which provides all the advantages of oil but which is solid and non-flowing at operating temperatures, which allows the construction of electrostatic condensers in cardboard or other non-metallic containers and which eliminates the necessity of expensive sealing means required in the use of oil or other fluid dielectrics.

A further object is the provision of a condenser of the closely wound foil type having a permanently thermoplastic, permanent liquifiable composite dielectric which tenaciously adheres to the condenser electrodes and which will not separate therefrom under any condition of condenser operation or non-operation over a long period of time and which will maintain indefinitely its initial relationship to and cooperation with the condenser electrodes and spacers.

Still another object is the provision of an electrostatic condenser of the wound foil spacer type utilizing a solid liquifiable dielectric capable of being vacuum impregnated in the condenser structure without pressure and which acts as a permanent relatively non-oxidizing seal.

Another object is the provision of an electrostatic condenser of the closely wound foil paper spacer type in which the paper spacers used are more porous than paper spacers heretofore used in such condensers and which are capable of accommodating a greater amount of dielectric of this invention than such previously used paper spacers.

Further objects will be apparent as the disclosure proceeds and from the drawings, in which Fig. 2 is a cross-sectional view of a condenser constructed according to the invention;

Figs. 5, 6 and 7 are curves showing the temperature-power factor characteristics of various dielectric compositions of the invention compared with dielectrics in common use.

Fig. 10 is a curve showing comparative breakdown voltage distribution of condensers constructed according to this invention and conventional condensers of the present commercial art.

Figure 1:
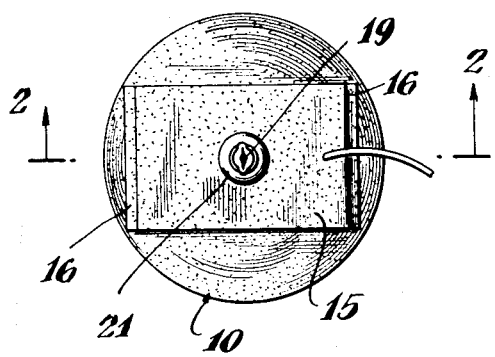
Fig. 1 is a top view in section of Fig. 2.

The art discloses the use of solid organic dielectric material in condensers suitable for use on direct current. Such condensers however will not operate on sustained alternating current because of the destructive electro-mechanical and electrochemical effects of the high tension alternating current and their inherent progressive rise in power factor loss with temperature. I have found that crystalline materials which are too rigid or brittle will show a shattered effect on the surface contact with the electrodes due to the electrostatic forces in the field. Where synthetic solid compounds have been used, for example, halogenated or cellulose ester compounds, I have observed that disassociation can occur with electrolytic effects, such as the splitting off of an acid radical or an halogen gas with alternating high tension current. These defects or characteristics produce a rise in power factor loss of the condenser with localized destructive effects and ultimate breakdown. Such effects are accelerated by high temperatures. Where paper spacers and fluid dielectrics are used, migration of impurities occurs, notwithstanding the presence of the spacers.

Heretofore, in order to obtain a condenser capable of continuous alternating current operation it has been necessary to use a liquid dielectric such as castor oil, mineral oil or a synthetic liquid dielectric such as chlorinated di-phenyl. These materials are capable of withstanding the alternating high tension fields because of their mobility, heat transfer and continuous contact with the electrodes, but have definite limitations especially in relation to the maximum ambient temperature at which they can continue operating and the maximum potentials which can be applied for a given thickness of dielectric or for a given spacing between foils. I have observed that at high temperatures these liquid dielectrics release ionizable material which due to the mobile state of the liquid dielectric is readily discharged between the close spaced electrodes and both electrolytic and cataphoric conduction take place coincident with progressive destruction. A practical drawback to the use of liquid dielectrics is the expensive necessity of providing liquid tight sealed containers. The cost of sealing an oil filled condenser and especially of preventing leaks at the terminals is oftentimes as great as the cost of the condenser section. Nevertheless, up to now, oil or other liquid dielectric condensers have been and are exclusively employed for continuous alternating current operation because no satisfactory solid organic dielectric condensers, capable of alternating current operation at commercial voltages or high temperatures, has been available. Because of the free flowing property of such liquid dielectrics and the tendency of impurities within the condenser to migrate, the paper spacers used between the foils have been of the highest density possible to obtain.

I have discovered that the combination of certain materials will produce a solid dielectric which in conjunction with closely spaced foil electrodes and a cellulose spacer allows the provision of electrostatic condensers of the wound foil type capable of long life continuous operation at low power factor on alternating current at high voltages and high temperatures. The base of the dielectric composition is an organic resin of the liquifiable and thermoplastic type. The resin is hydrogenated and oxygen resisting or non-absorbing; it is polymerized to a solid stable form. It is repeatedly liquifiable at temperatures below the destruction temperature of cellulose separators and when cooled reverts to its original condition. It is usually brittle but is thermoadhesive. In addition, this resin must possess the ability to combine with another dielectric which is fluid or which is liquifiable at temperatures below the destructon point of the porous spacer, which is also water repellent and which plasticizes the resin. The combination of the two dielectrics must produce a stable material of high specific resistance which is solid but slightly plastic, which does not readily oxidize or further polymerize in operation, which is permanently thermoplastic, which tenaciously adheres to the electrodes, which is repeatedly liquifiable without dissociation at temperatures below the destruction point of the porous spacer and at a low enough temperature, for instance, at least in the neighborhood of 110 degrees C. to 150 degrees C. so as to permit its ready and thorough impregnation by vacuum and without pressure into a tightly wound condenser unit employing a cellulose spacer, and the material should be sufficiently stable and immobile at all operating temperatures to prevent electrolytic or cataphoric migration of impurities between the foils; it should possess the property of acting as an effective waterproof seal for the condenser unit. Adhesion or bonding of the dielectric to the electrodes is an important factor in obtaining long operating life under normal and abnormal alternating current operation. The dielectric should not have a substantial positive coefficient of power factor loss at the highest required operating temperatures.

Unless the resin possesses the required characteristics, such as being liquifiable without essential change in physical structure when cooled, having a melting point below the maximum temperature that the cellulose spacers will stand, and having a low vicosity at impregnating temperatures, it will not form a satisfactory base for the condenser dielectric. The impregnation of the paper spacer condensers usually requires from five to fifteen hours at a temperature of 130 degrees C. to 150 degrees C. during which time the dielectric impregnant must remain stable and liquid to insure thorough and adequate impregnation. For this reason, unstable lower polymers of resins which progressively polymerize when heated and harden or solidify at high temperatures, are unsuitable.

In addition to the characteristics mentioned above, these resins have another unique property in common, that is, they will have a lower power factor at operating temperatures than at room temperatures. This property of possessing lower power factor at high temperatures, characteristic of the resins of this invention and the dielectric of which they form the base, is of great importance in preventing progressive destruction of the condenser at high operating temperatures. One of the major causes of breakdown of condensers used with capacitor motors, especially where the condenser is mounted within the motor frame, is the positive coefficient of power factor with temperature of the condenser dielectric. The dielectric breaks down due to progressive increase of power factor and temperature which tends to lower the dielectric strength. In direct contrast with this, the dielectrics of this invention have decreasing power factor with increasing temperatures, especially at temperatures experienced in small motors such as up to 60 degrees C. The lowering of this power factor introduces a protective factor, allowing operation over a considerably longer period than has been possible with present and prior art dielectrics.

Generally, it may be said that organic resins which are hydrogenated, polymerized, thermoplastic and repeatedly liquifiable at permissible impregnating temperature without essential change are suitable as the base of the dielectrics of this invention. Among such resins may be mentioned the following: The solid polymers of di-hydronaphthalene, hydrogenated indene, hydrogenated cumarone indene, hydrogenated acenaphthene, etc.

The most suitable resins of the above group are the non-polar thermoplastic polymerized hydrogenated resins containing solely carbon and hydrogen.

The addition of hydrogen to the conjugated ring structure of naphthalene ($C_{10}H_8$) to produce the di-hydronaphthalene ($C_{10}H_{10}$) and subsequent polymerization to the solid stage ($C_{40}H_{40}$) provides one of the best hydrocarbon resins for the purpose of this invention.

I have found that the limitations on the use of cumarone-indene and especially polyindene resins can be eliminated if they are hydrogenated.

The hydrogenation stabilizes the resins, reduces the tendency towards autooxidation which is a characteristic of cumarone, improves the power factor and voltage characteristics and also allows the production of non-separating homogeneous mineral oil mixtures of lower viscosity. The saturation of the resin with hydrogen tends to stabilize the structure against the effect of intense electrical stresses. The hydrogenated cumarone indene resins are permanently thermoplastic and do not become non-plastic over a period of operation and time, as do the unhydrogenated forms.

The application to polyindene resins is of special advantage because these resins are composed of an aromatic benzene nucleus ring and a cyclopentadiene nucleus. Hydrogenation of the aromatic or benzene ring causes the resin to assume properties of the cycloparaffins, which allows solubility in mineral oils.

Unhydrogenated indene or cumarone when exposed to air absorbs oxygen, whereas when hydrogenated they are stable and relatively free from oxidation effects. This is of considerable importance in electrostatic condensers where the potential might rise to a value where ionization of any residual occluded or absorbed air would cause accelerated oxidation.

While hydrogenated cumarone or a cumarone-indene mixture are satisfactory, the preferred material is the hydrogenated indene alone which, as indicated by its structure is a pure hydrocarbon possessing both olefinic and aromatic properties. Cumarone being the oxygen analogue of indene is not as suitable.

As pointed out, however, none of these highly polymerized hydrogenated resins when used alone are suitable as dielectrics. Due to their cracking on cooling and non-adherence to electrodes, they do not of themselves possess good voltage characteristics and the application of alternating currents produces shattering and vibration which tend to further impair their dielectric properties. The molecular structure of this resin accounts for its electrical and chemical stability. By itself, solid hydrogenated naphthalene possesses certain limitations which preclude to a great extent its application in that form as a dielectric for electrostatic condensers. It is very brittle, cracks on cooling, is too viscid when heated to the melting point and condensers made with it show a low voltage breakdown with destructive electrical field effects due to its rigidity and lack of adequate impregnation. When combined and plasticized in the manner hereinafter described, however, a solid organic material is produced which is eminently satisfactory for use on continuous alternating current.

While the naphthalene base has given the preferred hydrogenated derivatives the hydrogenated derivatives of both alpha methylnaphthalene and beta methylnaphthalene could be used. Both react in the hydrogenation process as by the sodium addition method in an identical manner to produce the dihydro-derivative and respective polymers.

Ordinary commercial cumarone-indene resins are not satisfactory as solid dielectrics even though plasticized. In contrast to the hydrogenated resins, they do not readily dissolve in plasticizing dielectric oils such as mineral and castor oils to form non-separating homogeneous compositions, but tend rather, to form emulsions with such oils as can be noted by the white color and separation on cooling. Vegetable oils with which they may be miscible, for instance, linseed, tung or oiticica oil are in themselves poor dielectrics, being unstable and having very poor power factor temperature characteristics, which properties are especially undesirable when the object is to provide for continuous operation at alternating currents. The unhydrogenated cumarone-indenes form very viscid and gummy products, even when plasticized with as much as 40% oil, approximately the minimum quantity necessary to allow vacuum impregnation which impregnating process is a practical necessity if long condenser life is desired on alternating currents. While flowable mixtures which will impregnate highly porous spacers can be made, they do not adequately impregnate the commonly used thin kraft paper and have poor voltage and life characteristics. It is necessary to permanently combine the resin with a supplementary plasticizing dielectric.

Among the dielectrics which will combine with the above mentioned resins to form the required stable non-dissociating adhesive dielectrics are the following; non-drying dielectric oils such as mineral or castor oils (as distinguished from drying oils such as linseed or China wood oil which inherently tend to polymerize and harden with time), hydrogenated castor oil, chlorinated diphenyl liquid or resin, chlorinated naphthalene, dimers of the thermoplastic liquifiable resins, such as the dimers of di-hydronaphthalene, etc.

The product obtained from the combination of dielectrics from these two groups of materials, when heated together in the proper proportions meet the requirements for a solid stable organic dielectric capable of operating on alternating current in a closely wound type electrostatic condenser. Generally the dielectric may be prepared by heating the solid resin to a temperature such as 120 degrees C. to 140 degrees C. and when liquid, adding the oil or other plasticizing dielectric.

For most purposes the added dielectric should not be present in an amount greater than 40%, the preferred proportion being about 15% to 30% of the total dielectric. In some cases, however, where it is not necessary that the dielectric be hard under all operating conditions, it is possible that the added dielectric can comprise up to about 50% of the total dielectric.

Where viscid oils are used, it is of advantage to add 1% naphthalene to the oil in order to reduce the viscosity and facilitate impregnation of the condenser by the combined dielectrics.

A preferred combination, especially when used with porous paper separator or paper-regenerated sheet cellulose combination spacers, is one made by combining 79% solid hydrogenated naphthalene with 20% high grade mineral oil of a viscosity such as 100 Saybolt u. n. at 210 degrees F. and 1% naphthalene. The composition may be prepared by heating the solid hydrogenated naphthalene to 140 degrees C. and when completely liquid the added material such as the hydrocarbon oil is introduced and the mixture continuously stirred until a clear solution is obtained. If naphthalene is to be added it is put in at this stage and stirred with the mixture which is then allowed to cool. In its finished form this material is a clear fluorescent colored composition with a slight amber tint.

Where higher capacitances per unit volume of material are desired and where cost is not a major consideration the solid hydrogenated naphthalene can be combined and plasticized with 30% chlorinated di-phenyl of chlorinated naphthalene. The latter, when used alone is unstable on alternating current but is stabilized by the addition of the solid hydrogenated naphthalene and the combination is capable of operation on continuous alternating current.

In some cases where it may be desirable to merely raise the viscosity of a fluid dielectric such as oil or chlorinated di-phenyl, a small amount of one of the hydrogenated thermoplastic resins of this invention may be added to the liquid, the viscosity depending upon the amount of resin added. Ordinarily, however, and where a solid dielectric condenser is required the resin will always be present in a preponderating amount.

The characteristics of a condenser employing polymerized dihydronaphthalene resin-mineral oil dielectric compared with condensers of the present commercial art employing dielectrics of mineral oil and chlor diphenyl are shown in the graphs of Fig. 5 in which curve 6 represents the progressive increase in power factor with temperature of wound foil kraft paper spacer electrostatic condensers impregnated with 100% mineral oil. Curve 5 shows a similar characteristic in a condenser of identical construction impregnated with chlorinated di-phenyl, the rise in power factor with temperature being even more pronounced in this case than with the mineral oil condensers. Curves 1, 3 and 4 represent the power factor temperature characteristic of condensers of identical construction with the condensers, the characteristics of which are illustrated by curves 5 and 6, except that the chlorinated di-phenyl and mineral oil dielectrics have been replaced by dielectrics of this invention comprising 50% polymerized di-hydronaphthalene-50% mineral oil, 70% polymerized di-hydronaphthalene-30% mineral oil and 80% di-hydronaphthalene-20% mineral oil compositions, respectively. Curve 2 of Figure 5 illustrates the characteristics of a condenser identical in construction to the condenser the charatceristics of which are illustrated in curve 1, except that a linen paper separator has been substituted for the kraft paper separator, the dielectric of the condenser being otherwise the same. It will be noted that the linen paper separator condenser has a lower power factor.

Castor oil has long been recognized as a suitable dielectric for use in electrostatic condensers especially where the maximum dielectric is desired in a given space, the dielectric constant of castor oil being 4.2 compared with 2.7 for mineral oil.

However, there have been two factors limiting the use of castor oil as a dielectric. One factor is the chemical instability of the oil, it tending to form acidic materials on heating and also having a tendency to oxidize and polymerize.

Secondly, the inherently poor power factor versus temperature characteristics of castor oil are a drawback even in condensers which have been vacuum impregnated and wherein the heating during impregnation has been kept below decomposition temperature. For example the power factor of a castor oil impregnated paper spacer condenser will average 0.45% at 20 degrees C. whereas at 70 degrees C. its power factor increases to 5.8%. This drawback greatly limits the usefulness of castor oil impregnated condensers on alternating current applications such as for continuous A. C. operation and for capacitor motors where elevated ambient temperatures are encountered. Such operation would cause rapid progressive destruction of the condenser. Hydrogenated resins have one common property, that is they are resistant to oxidation. This property is of extreme importance when the hydrogenated resin is combined with an oil, for instance, castor oil. Castor oil is readily oxidizable and its use in condensers, even though it has a high dielectric constant, is limited because of this characteristic. When a hydrogenated resin is combined with the castor oil, however, a protection is afforded against oxidation, the character of the composite dielectric being quite different from that of castor oil. When added to the castor oil the hydrogenated resin protects the oil against decomposition at impregnation temperatures. The combined dielectric has a lower power factor than castor oil and considerably higher voltage breakdown due to the immobile state of the dielectric mixture which prevents ionic migration, the forerunner of electrolytic breakdown.

On the other hand, the addition of the oil (castor or mineral) to the resin produces a permanent physical effect on the resin, that is avoidance of cracking of the otherwise hard, brittle resin.

If the oil were not combined with the resin, the resin would crack, have a low breakdown voltage and ionization would occur in the minute cracks which would permeate the resin. Without the oil the viscosity of the resin would be too high to impregnate into a porous spacer of the paper type. Furthermore, the oil imparts an adhesive character to the dielectric allowing it to be better bonded to the electrode surfaces and spacer structure.

The combination of the thermoplastic resin with the oil provides a material which remains plastic at room temperature and which therefore, preserves its breakdown voltage.

The combination of the thermoplastic hydrocarbon resin and a dielectric such as castor oil, even when the castor oil is less than 40% of the total content, provides the high dielectric constant value of castor oil but changes entirely the other dielectric properties, for example, the composite dielectric has a resistance of about 3000 megohms per microfarad compared with about 400 megohms per microfarad for castor oil. This is mainly due to the immobilization of the castor oil into a material which at room temperature is solid and as the resistance of a dielectric mainly reflects electrolytic and cataphoric conduction, which conduction can only be had with ionic migration, the immobilization of any molecular migratable material brings about high insulation resistance. This is especially true with castor oil, which is a glycerol oleate compound. A large increase in resistance is also obtained when the resin is combined with mineral oil, this being likewise due to immobilization of any ionic components or impurities and the prevention of cataphoric action.

By combining castor oil with one of the resins of this invention a dielectric is obtained which permits operation at temperatures even above those which can be applied to other prior art dielectric such as chlorinated di-phenyls which have heretofore been credited with withstanding the highest temperatures.

One of the most useful of such dielectrics is that produced by the combination of polymerized di-hydronaphthalene resin ($C_{40}H_{40}$) with castor oil.

The relative percentage of castor oil and hydro-naphthalene will determine the power factor versus temperature characteristics and the flow point of the mixture.

If a solid dielectric is desired then the oil percentage should be 40% or less. When a thick viscid mass which has a cold flow is desired then the percentage of oil should be above 40%.

Although the limits for the proportions of the ingredients are not critical and it may, in some cases be possible to go outside the following ranges it may be stated that for most purposes the percentage of castor oil in the composition should preferably be within the range of 20 to 50%. The 5% castor-oil-95% hydro-naphthalene composition is rather brittle for ordinary use and the 70% castor oil dielectric exhibits to quite a marked extent the disadvantages of plain castor oil.

In order to illustrate the improved power factor of certain of the combinations as compared with other dielectric materials reference is made to Figure 6 and to the accompanying graphs showing the effect of temperature on the power factor of electrostatic condensers having paper spacers impregnated with the combination of castor oil and the polymer of di-hydronaphthalene and others impregnated with 100% castor oil.

In the graphs of the drawings curve 9 illustrates the rapid progressive increase in the power factor of a plain castor oil impregnated condenser with temperature. In A. C. operation this rapid increase would result in increasingly rapid heating of the condenser with increase of temperatures producing progressive self-destruction.

Curves 7, 8 and 11 show the power factor versus temperature characteristics of condensers of identical construction with that of the condensers the characteristics of which are shown on curve 9, except that the condensers instead of being impregnated with 100% castor oil have been impregnated with polymerized di-hydronaphthalene dielectrics containing 20%, 30% and 50% castor oil, respectively. Curve 10 is a condenser of identical construction and dielectric the characteristics of which are illustrated in curve 8 except that a linen paper separator has been substituted for the kraft paper separator.

An interesting modification of the characteristics of the resin-mineral oil or resin-castor oil dielectrics of this invention can be obtained by combining the resin with a mixture of both oils. The beneficial results of such modifications are illustrated in curves 12 and 13 of Figure 6 in which dielectrics of 75% resin-15% castor oil-10% mineral oil and 70% resin-25% castor oil-5% mineral oil are illustrated.

In Figure 7 is shown a series of curves illustrating the temperature-power factor characteristics of condensers of the present commercial art compared with condensers employing the hydrogenated indene resin base dielectrics of this invention. Curve 1 illustrates the temperature power factor characteristics of a wound foil kraft paper spacer type electrostatic condenser impregnated with castor oil. Curve 5 indicates the temperature power factor characteristics of a condenser of identical construction impregnated with a dielectric of 60% hydrogenated indene resin and 40% castor oil. Curve 6 indicates the unusual characteristics of a condenser of identical construction employing a composite dielectric formed from 60% hydrogenated indene resin-30% castor oil and 10% mineral oil. Generally, a minimum of 60% resin is required to provide a solid dielectric.

Figure 8:
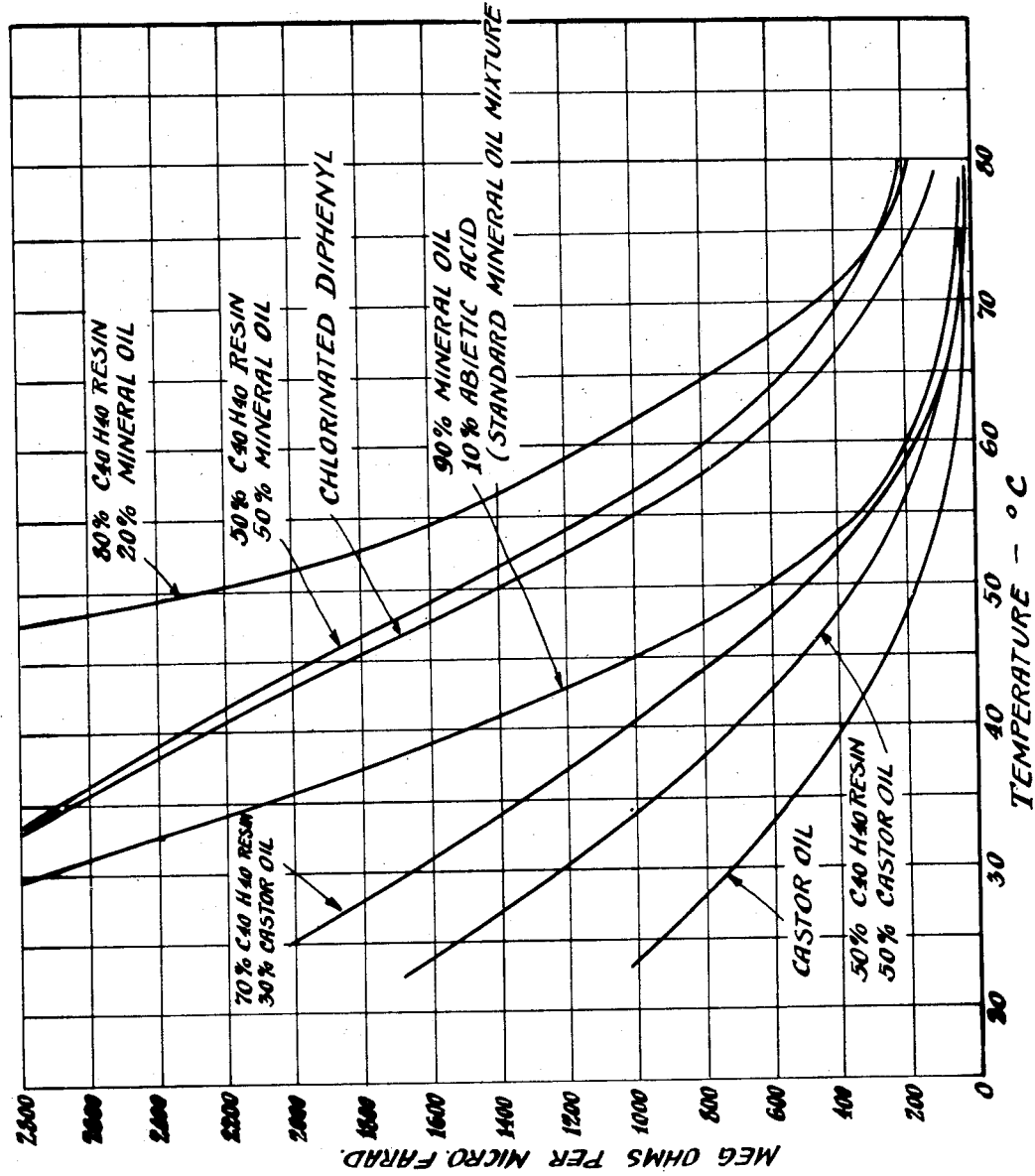
Fig. 8 is a curve showing the temperature resistance characteristics of various dielectric compositions of the invention compared with dielectrics in common use.

In Figure 8 is shown a series of curves giving the resistance temperature characteristics of dielectrics of this invention compared with present commercial art chlorinated di phenyl and mineral oil dielectrics and also in comparison with castor oil dielectrics. As will be noted from these curves, all of which have been identified on the drawing, the resistance temperature characteristic of all of the resin oil combinations are superior to that of castor oil and that both of the $C_{40}H_{40}$-mineral oil dielectrics are superior in resistance temperature characteristics to the standard mineral oil and chlorinated di phenyl dielectrics.

Figure 9:
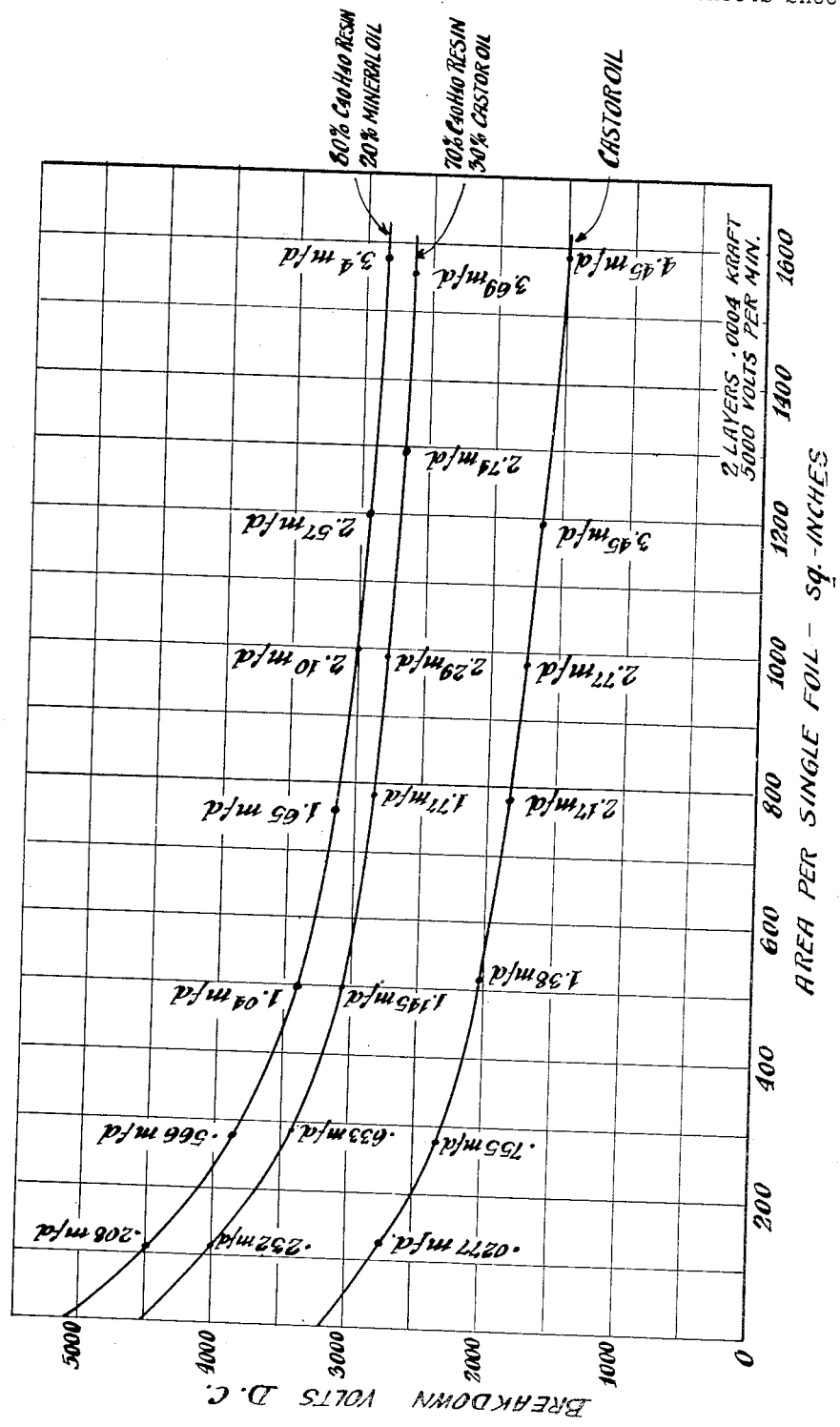
Fig. 9 is a curve showing the breakdown area curves of typical condensers of this invention compared with condensers of the present commercial art.

In Figure 9 is shown breakdown area curves for wound foil paper spacer electrostatic condensers employing castor oil dielectrics in comparison with condensers of similar construction employing dielectrics of 80% $C_{40}H_{40}$-20% mineral oil and 70% $C_{40}H_{40}$-30% castor oil dielectrics, respectively. These curves are taken on the basis of 10 units per point, at 5000 volts per minute, at room temperature. In these curves is given the relation of breakdown voltage, with reference to the number of condensers constructed, so that it is possible to determine the average breakdown value for a given surface area for an impregnated dielectric.

Figure 10 gives breakdown voltage distribution curves on a series of wound foil kraft paper spacer electrostatic condensers of the present commercial art, including such condensers impregnated with light mineral oil, castor oil and heavy mineral-oil containing 10% abietic acid, in comparison with condensers of similar construction employing dielectrics of 80% $C_{40}H_{40}$-20% mineral oil and 70% $C_{40}H_{40}$-30% castor oil. These curves were determined at a 5000 volts per minute rate at room temperature. It will be seen that these curves graphically illustrate the relation of breakdown voltage in respect to the area of the electrodes. They indicate that the maximum breakdown value is obtained with smaller surface areas of impregnated dielectrics. This is probably controlled by the number of metal particles in the paper. The condensers of this invention may be constructed in various types. The drawings illustrate a wound foil spacer type condenser and a cast form.

Figure 2:
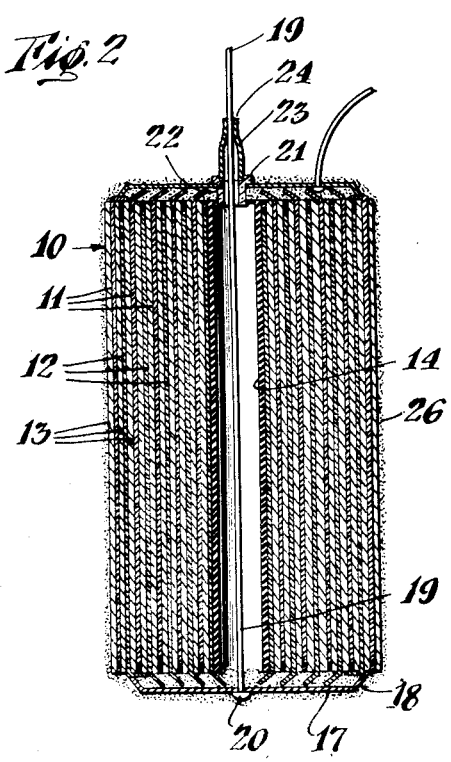

In Figures 1 and 2 the condenser section 10 comprises a pair of metal foil electrodes 11 and 12, preferably .0003" aluminum wound together with a pair of highly porous linen paper spacers 13 .0003" thick. The foils are offset so that foil 11 projects beyond the paper at the top of the roll and terminates short of the spacers at the bottom and foil 12 projects at the bottom and is overlapped by the spacers at the top. The foils and paper are wound around hollow mandrel 14. Connection with the offset electrode is made by means of rectangular bronze spring plates 15 and 17, having bent down contacting portions 16 and 18 respectively, the edges of which make contact with electrode foils 11 and 12. Plate 17 has attached thereto wire terminal 19, soldered to the plate at 20, the wire being pulled up through mandrel 14. Plate 15 has a central aperture into which is inserted ceramic insulator 21 into which closely fits metal tube 23 through which passes wire terminal 19. In assembling the condenser after winding, the wire 19 is tightly pulled up so as to cause plates 15 and 17 to make close pressure contact with the electrodes and tube 23 is then flattened as shown at 24 so as to permanently lock the assembly in place. A terminal for electrode 12 is provided by soldering a wire 25 to plate 15. After the condenser has been thus assembled it is evacuated to remove all moisture and is then impregnated with a solution of one of the dielectrics of this invention, for instance, a mixture of 79% solid hydrogenated napthalene-20% dielectric oil-1% naphthalene. The impregnation is carried out at a temperature in the order of 145 degrees C. to 150 degrees C. which temperature range appears to be most satisfactory for the dielectric of the invention, and the fluid dielectric completely saturates the paper spacers. The impregnant 26 acts as a complete seal for the condenser and ordinarily no additional seal is required, other than the usual container, such as cardboard or metal. If increased voltage break-down is desirable, I may add a sheet of specially processed regenerated sheet cellulose for each of the paper spacers. The combination paper-regenerated sheet cellulose separators are especially useful for a number of applications.

Due to the very high resistance to moisture of the dielectric materials described, no further sealing compound need be applied after the condenser is impregnated.

An important element in the condenser of this invention is the paper spacer. While it is possible to use spacers of the type heretofore used in electrostatic condenser construction I have found that the use of a more porous type of paper is highly advantageous. The resin dielectric of this invention, although liquid at high temperatures has a high viscosity and when used in combination with a paper spacer .3 mil thick, having a porosity of approximately 2.5 cc. to 3 cc. in 15 seconds, such as is customarily used in oil or wax condensers, does not provide an entirely satisfactory condenser. By using a paper having a porosity of about 5 cc. in 15 seconds or more, however, a more complete impregnation is effected with consequent high voltage breakdown. This porosity value is to some extent dependent upon the thickness of the paper spacer and may with advantage be raised. In the condenser of this invention, the dielectric being solid and adhesive remains in place, unlike the liquid dielectric of the prior art, and does not depend on the paper to maintain the separation. Therefore, the most porous paper consistent with adequate tensile strength for winding and density to maintain an initial uniform spacing, is the preferred paper.

Figure 3:
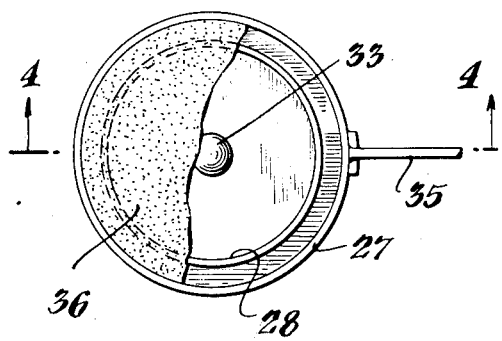
Fig. 4 is a view in section of a cast condenser made according to the invention and Fig. 3 is a top view of Fig. 4.
Figure 4:
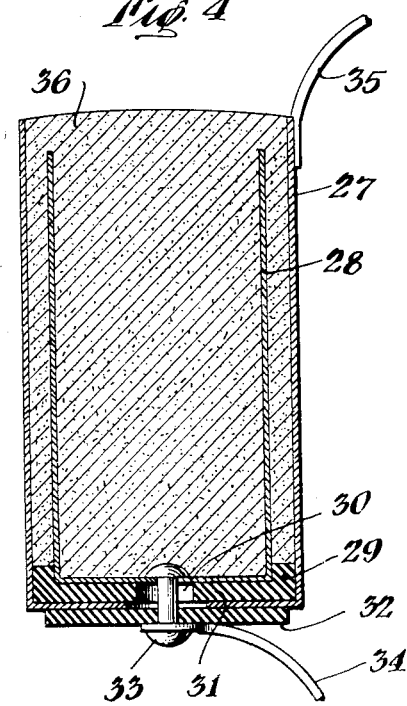

In Figures 3 and 4 which show a cast form of the condenser in greatly exaggerated size, the electrodes consist of the concentric aluminum tubes 27 and 28 separated by ceramic collar 29. Rivet 33 which contacts electrodes 28, extends through wide apertures 30 and 31 in ceramic collar 29 and electrode 27, respectively, and through insulating button 32. Wire terminal 34 soldered or otherwise attached to rivet 33 and wire 35 is soldered to electrode 27 in order to provide the other terminal. After the assembly has been completed, a hot fluid solution of one of the suitable dielectrics of this invention for instance, a mixture of 60% polymerized hydrogenated indene-30% castor oil-10% mineral oil dielectric 36 is poured at a temperature of 150 degrees C. and rapidly cooled in place into solid form. In other constructions, the dielectric in powdered form can be pressed into shape with one or both electrodes, heated to 150 degrees C. and cooled. If desirable one of the electrodes can be formed by metal spraying and a terminal fastened to the sprayed surface.

The construction shown in Figures 1 and 2 employs a paper separator, but it is possible and in some cases desirable to substitute for the paper a separator of pre-shrunk regenerated plasticizer free sheet cellulose.

While I have described two types of electrostatic condensers employing the solid hydrocarbon base polymer resin dielectric it is also possible to manufacture the condenser by other methods known to the art, for instance, by directly coating foil electrodes with the dielectric composition without the use of an additional intervening spacer or by impregnating a porous spacer such as paper with the dielectric, thereafter winding the impregnated paper spacers with the electrode foils and subsequently heating the rolled unit to cause the impregnated paper to adhere to the foils and to provide a moisture proof seal around the unit.

With many materials, such as with several resin dielectrics of this invention, the power factor obtained after impregnation in a porous spacer such as paper is many times that of the resin itself. By using an inorganic spacer as made by coating the aluminum foil with a bonded layer of powdered silica suspended in a polystyrene solution, thereafter impregnating a unit wound with this coated foil instead of paper, it is possible to obtain lower power factors.

What is claimed is:

1. In an electrostatic condenser, a dielectric comprising in major proportions the product of an hydrogenated polymerized, thermoplastic, thermoadhesive, liquifiable hydrocarbon resin having a plasticizing dielectric combined therewith, said composite dielectric being thermoplastic, thermoadhesive, liquifiable and stable under all operating conditions.

2. In an electrostatic condenser comprising electrodes and spacers, a solid dielectric comprising in major proportions the product of an hydrogenated polymerized, thermoplastic, thermoadhesive, liquifiable hydrocarbon resin having a relatively smaller amount of plasticizing dielectric combined therewith, said composite dielectric being thermoplastic, thermoadhesive, liquifiable and stable under all operating conditions, and said dielectric being adapted to tenaciously adhere to electrodes and spacers.

3. In an electrostatic condenser comprising electrodes and spacers, a dielectric comprising in major proportions the product of an hydrogenated, polymerized, thermoplastic, thermoadhesive, liquifiable hydrocarbon resin and between 15% and 30% of a plasticizing dielectric combined therewith, said composite dielectric being thermoplastic, thermoadhesive, liquifiable and stable under all operating conditions and said dielectric being adapted to tenaciously adhere to electrodes and spacers.

4. In an electrostatic condenser comprising electrodes and spacers, a dielectric comprising in major proportions the product of an hydrogenated, polymerized, thermoplastic, thermoadhesive, liquifiable hydrocarbon resin of the group consisting of solid hydrogenated naphthalene, hydrogenated cumarone-indene polymer, hydrogenated indene polymer and solid hydrogenated acenaphthene, and a plasticizing dielectric combined therewith, said composite dielectric being thermoplastic, thermoadhesive, liquifiable and stable under all operating conditions, and said dielectric being adapted to tenaciously adhere to electrodes and spacers.

5. In an electrostatic condenser comprising electrodes and spacers, a dielectic comprising in major proportions the product of an hydrogenated polymerized, thermoplastic, thermoadhesive, liquifiable hydrocarbon resin containing solely carbon and hydrogen, and a plasticizing dielectric combined therewith, said composite dielectric being thermoplastic, thermoadhesive, liquifiable and stable under all operating conditions, and said dielectric being adapted to tenaciously adhere to electrodes and spaces.

6. In an electrostatic condenser comprising electrodes and spacers, a dielectric comprising in major proportions the product of solid hydrogenated naphthalene polymer and a plasticizing dielectric combined therewith, said composite dielectric being thermoplastic, thermoadhesive, liquifiable and stable under all operating conditions, and said dielectric being adapted to tenaciously adhere to electrodes and spacers.

7. In a wound foil-spacer type electrostatic condenser comprising electrodes and spacers, a dielectric comprising in major proportions the product of solid hydrogenated naphthalene polymer and mineral oil combined therewith, said composite dielectric being thermoplastic, thermoadhesive, liquifiable and stable under all operating conditions, and said dielectric being adapted to tenaciously adhere to electrodes and spacers.

8. In a wound foil-spacer type electrostatic condenser comprising electrodes and spacers, a dielectric comprising in major proportions the product of hydrogenated polymerized indene and a plasticizing dielectric combined therewith, said composite dielectric being thermoplastic, thermoadhesive, liquifiable and stable under all operating conditions, and said dielectric being adapted to tenaciously adhere to electrodes and spacers.

9. In a wound foil-spacer type electrostatic condenser comprising electrodes and spacers, a dielectric comprising in major proportions the product of an hydrogenated, polymerized, thermoplastic, thermoadhesive liquifiable hydrocarbon resin having a plasticizing dielectric combined therewith, said composite dielectric being thermoplastic, thermoadhesive, liquifiable and stable under all operating conditions, and said dielectric being adapted to tenaciously adhere to electrodes and spacers, said composite dielectric having a lower power factor at operating temperatures than at normal non-operating temperatures.

10. In a wound foil-spacer type electrostatic condenser comprising electrodes and spacers, a dielectric comprising in major proportions the product of an hydrogenated polymerized, thermoplastic, thermoadhesive, liquifiable hydrocarbon resin having a plasticizing dielectric combined therewith, said composite dielectric being thermoplastic, thermoadhesive, liquifiable and stable under all operating conditions, and said dielectric being adapted to tenaciously adhere to electrodes and spacers, said composite dielectric having a power factor at 60° C. lower than the power factor at 20° C.

11. A dry electrostatic condenser having a dielectric comprising the product of an hydrogenated thermoplastic, thermoadhesive, liquifiable resin and a plasticizing dielectric combined therewith, said combined dielectric being thermoplastic, thermoadhesive, liquifiable, stable and non-dissociating under all operating conditions.

12. A dielectric for electrostatic condensers and the like, comprising in major proportions the product of a solid, hydrogenated polymerized thermoplastic hydrocarbon resin and a plasticizing dielectric combined therewith.

13. An electrostatic condenser having closely spaced electrode foils, a spacer therebetween and a dielectric comprising in major proportions the product of an hydrogenated, polymerized, thermoplastic, thermoadhesive, liquifiable hydrocarbon resin having a plasticizing dielectric combined therewith.

14. A condenser having a dielectric comprising essentially a solid plasticized polymerized hydrogenated thermoplastic thermoadhesive liquifiable hydrocarbon resin.

SAMUEL RUBEN.